March 24, 1959     G. GAFFNEY     2,878,804
APPARATUS FOR HEATING LIQUIDS
Filed Sept. 23, 1954     2 Sheets-Sheet 1
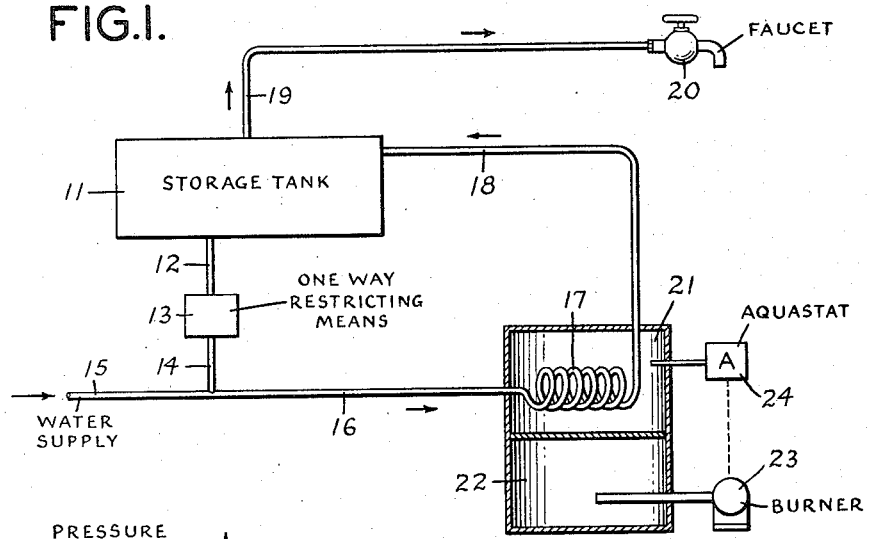
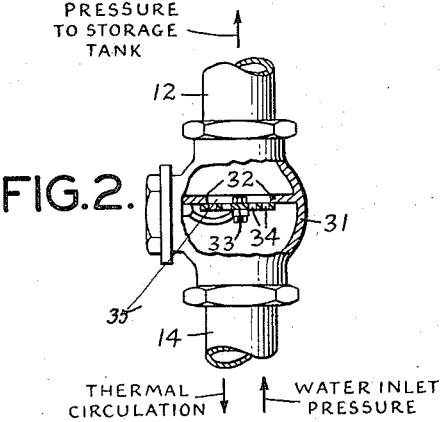
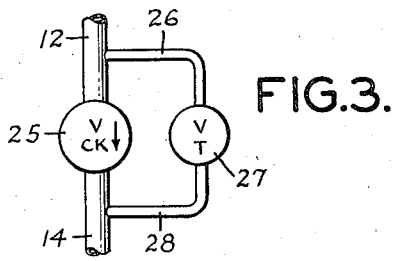
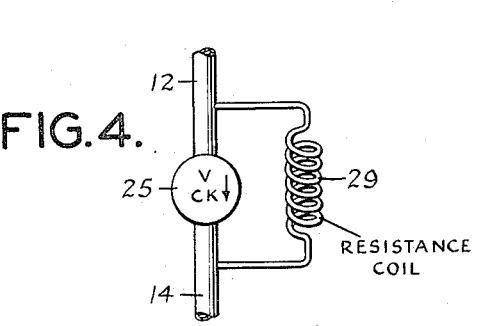
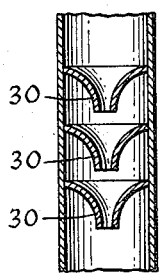
INVENTOR
GERALD GAFFNEY
BY
*Merton H. Douthitt*
ATTORNEY

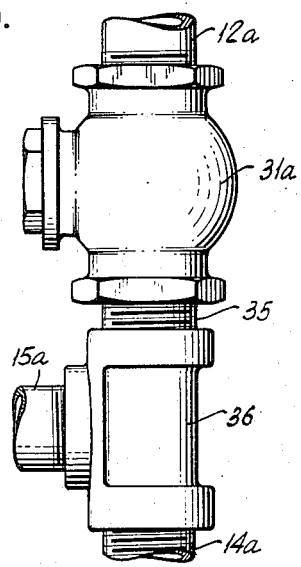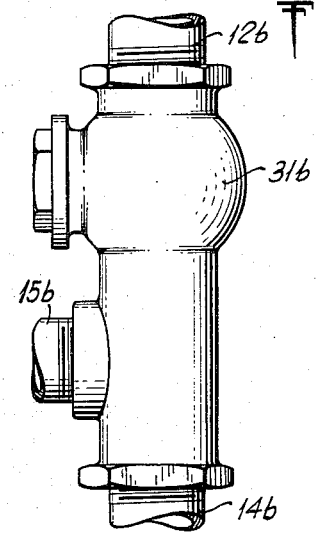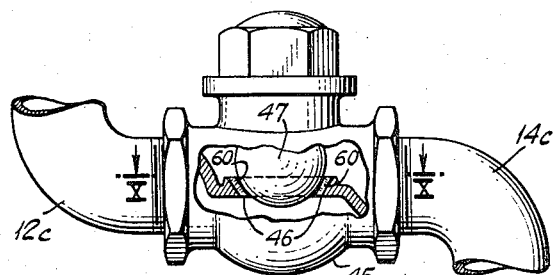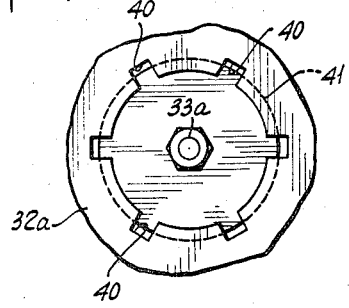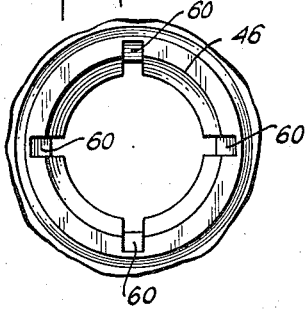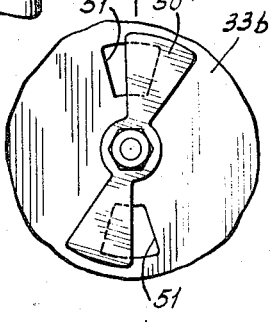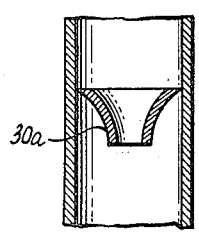

United States Patent Office 2,878,804
Patented Mar. 24, 1959

2,878,804

APPARATUS FOR HEATING LIQUIDS

Gerald Gaffney, Ridgefield, Conn.

Application September 23, 1954, Serial No. 457,855

7 Claims. (Cl. 126—362)

This invention relates to apparatus for heating liquids, and more particularly to such heating systems wherein liquid circulates by thermal convection through a heating circuit extending out of and back to a storage tank, this type of flow being referred to as thermal circulation herein.

Broadly my heating system comprises: a storage tank having exit means for heated liquid and inlet and outlet connections for thermal circulation of liquid contents out of and back into said tank; and a liquid-heating circuit external of said tank, said circuit being adapted to conduct liquid flow by thermal circulation therethrough from said outlet to said inlet connection, said circuit including heat transfer surface, a feed inlet disposed between said outlet connection and said heat transfer surface, means restricting back-flow from said feed inlet to said outlet connection, said means restricting back-flow being interposed between said feed inlet and said outlet connection, and means transmitting liquid pressure in said circuit from the thermal circulation discharge side of said means restricting back-flow to the thermal circulation entrance side thereof.

In the past it has been proposed to maintain a check valve in the circuit to force fresh feed towards the heat exchanger. However the check valve "chatters" in such installation, that is, the movable element (e.g., the gate or ball) hammers open and closed when hot liquid is drawn from the tank and fresh feed rushes in. The chattering is deleterious to the installation and is a severe annoyance also from the standpoint of noise. My invention eliminates chattering.

Other advantages of my system include: high capacity for liquid heating; extended trouble-free operation without necessity for cleanout and maintenance; low cost; and simplicity. My system is particularly advantageous for domestic hot water heating systems because of these advantages.

The drawings depict several aspects of my invention. Figure 1 is a schematic flow diagram outlining a preferred way in which my invention can be installed for heating domestic hot water. Item numbers which differ only by addendum letters identify similar elements in different embodiments. Figures 2, 3, 4, 5, 9, 10 and 11, show alternate installations of the combination of back-flow restricting means and means transmitting liquid pressure. Figure 8 shows a suitable seat to receive a swing gate for use in my system, and Figure 12 shows a suitable swing gate for a check valve which can be used in my system. These figures will be described more fully hereinafter. Figures 6 and 7 show a combination check valve and fresh feed inlet. Horizontal storage tank 11 has exit means for hot water comprising pipe 19 leading to faucet 20. The liquid heating circuit commences with pipe 12 leading from storage tank 11 to swing check valve 13 having a swing gate which is perforated. The structure of this check valve is more fully discussed hereinafter. The circuit continues with pipe 14 leading out of check valve 13, joining water supply inlet 15 in a T connection, and running through pipe 16 into heating coil 17. Heating coil 17 is immersed in heating jacket 21 mounted so as to receive heat from flame in firebox 22, the flame being generated by burner 23. Temperature of the heating jacket contents is regulated by aquastat 24 acting on burner 23. Pipe 18 completes the circuit returning from coil 17 to tank 11.

When faucet 20 is off, check valve 13 is open and the water stored in tank 11 is heated by thermal circulation, leaving tank 11 through pipe 12, entering and passing through check valve 13, discharging into pipe 14, continuing around through pipe 16, through coil 17 and back to the tank through pipe 18. In the preferred installation the elevation of pipe 18 is below the top of storage tank so that gases are not trapped in pipe 18, thereby impeding or stopping thermal circulation.

When faucet 20 is opened, supply water rushes in pipe 15, closes the swing gate in check valve 13, pushes through pipe 16, and coil 17 and pipe 18. Water pressure is also transmitted towards the storage tank through check valve 13 by the holes in the swing gate, thereby preventing chattering of the gate. The flow of supply water through pipe 16, and coil 17, and pipe 18 acts to flush the system of debris, sediment, and the like.

A branch line can be run off feed water supply pipe 15 and into a blending device (not shown) with pipe 19 upstream of faucet 20 if tempered water is desired from the faucet.

Figure 2 shows one particular combination of my invention, namely the check valve symbolized by item 13 of Figure 1. Item 31 represents the body of a conventional swing check valve connected for thermal circulation entrance by pipe 12 and for thermal circulation discharge by pipe 14 as set out in Figure 1. Body 31 is broken away to present in vertical section swing gate 33 perforated clear through with a plurality of holes 34 and seat 32 around port 35. The gate is shown in closed position in reaction to water inlet pressure from the water supply line with pressure being transmitted through the gate towards the storage tank. When the gate is open thermal circulation runs in the direction indicated. The perforate gate of my invention can be adapted for simple insertion in a conventional swing check valve in place of the imperforate gate with which the valve comes equipped.

A combination of my invention which is foolproof for correct installation is the swing check valve having the perforated gate mounted in operative association with a feed water inlet. The feed water inlet (e.g., pipe 15 of Figure 1) is T'd with a short nipple extending from that end of the check valve body which discharges thermally circulated water. Figure 6 shows such structure. Pipe 12a leads from the storage tank (not shown) into swing check valve 31a, a valve like valve 31 of Figure 2. The end of check valve 31a which discharges thermally circulated water is joined to T 36 by means of short nipple 35. Pipe 15a is the feed water inlet, and pipe 14a conducts water to the heating coil. Instead of use of a T, the feed water inlet may be connected directly into the check valve body near the end thereof which discharges thermally circulated water. The feed water inlet and check valve body may be a unitary casting, or an assembly of conventional items. Figure 7 shows the feed water inlet, item 15b, entering the body of swing check valve 31b, a valve similar to valve 31 of Figure 2 except that the end of the valve body which discharges thermally circulated water is elongated to accommodate a connection with feed inlet 15b. Pipe 12b leads from the storage tank (not shown) and pipe 14b conducts water to the heating coil.

I have found that the passageway through the swing gate for the swing check valve should aggregate generally at least about 15% and preferably about 25% of the area of the port over which the gate closes to insure elimination of chattering. When the area of passageway aggregates substantially more than about 60% and, in preferred installation, about 40% of the area of the port over which the gate closes, too much feed liquid is apt to by-pass the heat transfer surface and short-circuit to the tank, thereby not flushing the circuit as forcefully as desired.

In place of a swing check valve with holes in the gate, I can use a solid gate fitting on a seat perforated, e.g., with notches, to transmit liquid pressure from one side to the other of the valve. Figure 8 shows this. Item 32a represents a portion of the valve seat broken away. Swing gate 33a closes on the seat at periphery 41 and leaves partly open notches 40 in the seat. Alternately I can use a conventional ball check valve having a seat notched to so transmit pressure. Figure 9 shows this. Pipe 12c brings in thermally circulated water to body 45 of a conventional ball check valve. The body is broken away to present a vertical section of ball 47 setting on notched seat 46. Thermally circulated water flows out through pipe 14c. Figure 10 is a detailed section of notched seat 46, with other parts removed taken in plan through section X—X of Figure 9. The rim of the seat contains notches 60. The ratio of liquid passageway to port area covered by the movable member of any check valve should be essentially the same as for the preferred swing check valve to obtain the particular benefits of my invention.

Figure 3 shows an alternate installation of the combination flow restricting means-pressure transmitting means unit. Item 12 is a pipe for thermal circulation entrance and item 14 a pipe for thermal circulation discharge. Item 25 is a conventional check valve which recloses completely in response to water inlet pressure from a supply line (not shown) T'd into line 14. Line 28 leads into and line 26 out of throttling valve 27, e.g., a conventional globe or gate valve, for by-passing check valve 25. Valve 27 can be adjusted to an open position sufficiently wide to prevent chatter of check valve 25.

Figure 4 shows a second alternate installation of the combination flow restricting means-pressure transmitting means unit. Items 12, 14, and 25 are the same as those described for Figure 3. Item 29 is a small diameter resistance coil of tubing connected to by-pass check valve 25. Shape, length, and diameter of the coil can be varied to stop check valve chatter.

Figure 5 shows a third alternate installation of the combination flow restricting means-pressure transmitting means unit. Items 30 are a series of rounded entrance nozzles pointed in the direction of thermal circulation from the storage tank and fitted between the storage tank and the water supply feed line. The coefficient of discharge is very high in the direction of thermal circulation and very poor in the opposite direction, thereby permitting good thermal circulation, yet effectively restricting back-flow from the feed inlet to the tank and transmitting liquid pressure in the circuit through their discharge ports. Instead of a series of such nozzles, a single nozzle of the type described can be utilized in the same way for the liquid heating system of my invention. Figure 11 shows such single nozzle 30 pointed in the direction of thermal discharge from the storage tank and fitted between the storage tank and the water supply feed line. Another modification of my invention is a specially perforated swing gate for use in a swing check valve body of conventional design, said swing gate having apertures about its center and adjustable shutter means concentrically mounted thereon for moving into and out of register with said gate apertures for precise regulation of the area of liquid passage when the gate is in closed position. Such gate is shown in Figure 12, item 33b being the gate having apertures 51 and shutter 50 pivotable at the center of the gate. My heating system can be equipped, of course, with relief valves and other devices desirable from a safety standpoint or required by local building codes; such devices are not shown in the drawings as they constitute no part of my invention.

Obviously, many modifications and variations of the invention, as hereinbefore set forth, may be made without departing from the spirit and scope thereof, and therefore only such limitations should be imposed as are indicated in the appended claims.

I claim:

1. A heating system for liquid comprising: a storage tank having exit means for heated liquid and inlet and outlet connections for thermal circulation of liquid contents out of and back into said tank; and a liquid-heating circuit external of said tank, said circuit being adapted to conduct liquid flow by thermal circulation therethrough from said outlet to said inlet connection, said circuit including heat transfer surface, a feed inlet disposed between said outlet connection and said heat transfer surface, means restricting back-flow from said feed inlet to said outlet connection, said means restricting back-flow being interposed between said feed inlet and said outlet connection, and passage means for liquid extending from the thermal circulation discharge side of said means restricting back-flow to the thermal circulation entrance side thereof, the association of said means restricting back-flow and said passage means acting to divert sufficient fresh liquid feed from said feed inlet towards the thermal circulation entrance side of said means restricting back-flow for precluding chattering when hot liquid is withdrawn from said storage tank and fresh liquid feed enters the heating system.

2. The heating system of claim 1 wherein said means restricting back-flow is a check valve having a movable member for restraining flow from said fresh feed inlet to said outlet connection, and said passage means is at least one passageway open to liquid flow regardless of the position of said movable member.

3. The heating system of claim 2 wherein said means restricting back-flow is a swing check valve, the swing gate of which has passageway therethrough aggregating between about 15% and about 60% of the area of the port over which said gate closes.

4. The heating system of claim 2 wherein said means restricting back-flow is a swing check valve, the swing gate of which has passageway therethrough aggregating between about 25% and about 40% of the area of the port over which said gate closes.

5. The heating system of claim 1 wherein said means restricting back-flow is a swing check valve and said passage means is a by-pass therearound having flow throttling means.

6. A heating system for water comprising: a storage tank having exit means for heated water and inlet and outlet connections for thermal circulation of water contents out of and back into said tank; and a water-heating circuit external of said tank, said circuit being adapted to conduct water flow by thermal circulation therethrough from said outlet to said inlet connection, said circuit including heat transfer surface, the elevation of that portion of the circuit running from said heat transfer surface to said storage tank being below the top of said storage tank, a feed inlet disposed between said outlet connection and said heat transfer surface, means restricting back-flow from said feed inlet to said outlet connection, said means restricting back-flow interposed between said feed inlet and said outlet connection, and a passage for liquid extending from one side to the other of said means restricting back-flow, the association of said means restricting back-flow and said passage for liquid acting to divert sufficient fresh feed water from said feed inlet towards the thermal circulation entrance side of said means restricting back-flow for precluding chattering when hot water is withdrawn from said storage tank and fresh water feed enters the system.

7. The heating system of claim 6 wherein said means restricting back-flow is a swing check valve, the swing gate of which has passageway therethrough aggregating between about 25% and about 40% of the area of the port over which said gate closes.

References Cited in the file of this patent

UNITED STATES PATENTS

| | | |
|---|---|---|
| 1,040,730 | Moore | Oct. 8, 1912 |
| 2,101,315 | Kemp | Dec. 7, 1937 |
| 2,399,985 | Chandler | May 7, 1946 |
| 2,446,139 | Lyons | July 27, 1948 |
| 2,610,822 | Lemos | Sept. 16, 1952 |